United States Patent [19]
Allen et al.

[11] 3,714,998
[45] Feb. 6, 1973

[54] WEIGHING SCALE WITH IMPROVED DASH POT

[75] Inventors: Kenneth C. Allen; Edwin E. Boshinski, Dayton, Ohio

[73] Assignee: The Hobart Manufacturing Company, Troy, Ohio

[22] Filed: Feb. 4, 1971

[21] Appl. No.: 112,588

[52] U.S. Cl. ............................. 177/189, 177/DIG. 1
[51] Int. Cl. .............................................. G01g 23/08
[58] Field of Search ..................... 177/184, 186–189, 177/DIG. 1

[56] References Cited

UNITED STATES PATENTS

| | | |
|---|---|---|
| 935,571 | 9/1909 | Worthington ........................ 177/187 |
| 1,096,096 | 5/1914 | Burkholder ...................... 177/188 X |
| 1,279,646 | 9/1918 | Bryce ............................. 177/188 X |
| 1,890,977 | 12/1932 | Kelley ............................ 177/189 X |
| 2,383,404 | 8/1945 | Meeker et al. ..................... 177/188 |
| 2,464,445 | 3/1949 | Guldbrandsen ..................... 177/186 |
| 2,475,685 | 7/1949 | Williams ........................... 177/188 |

FOREIGN PATENTS OR APPLICATIONS

| | | |
|---|---|---|
| 283,207 | 3/1931 | Italy ................................. 177/188 |
| 352,640 | 9/1937 | Italy ................................. 177/184 |

*Primary Examiner*—Robert S. Ward, Jr.
*Attorney*—Marechal, Biebel, French & Bugg

[57] ABSTRACT

An improved dash pot for use with a weighing scale allows a scale platter to move to a balance position quickly while providing the necessary dampening of scale movement which will permit accurate reading of an indication representing the weight placed on the platter. The dash pot includes a cylinder containing a liquid and a plate mounted to move within said cylinder in response to platter movement. The plate is provided with openings which are closed by leaf springs until the force exerted on the plate by the liquid increases above a predetermined magnitude at which time the valve opens, allowing a more rapid transfer of liquid from one side of the plate to the other thus permitting the platter to move quickly to a new position. When the platter reaches the new balance position, the valves close and more effective dampening of minor movements of the platform is then provided by the dash pot. Different size openings and/or leaf spring thicknesses and tensions may be provided to control the speed of movement of the platter in opposite directions.

3 Claims, 7 Drawing Figures

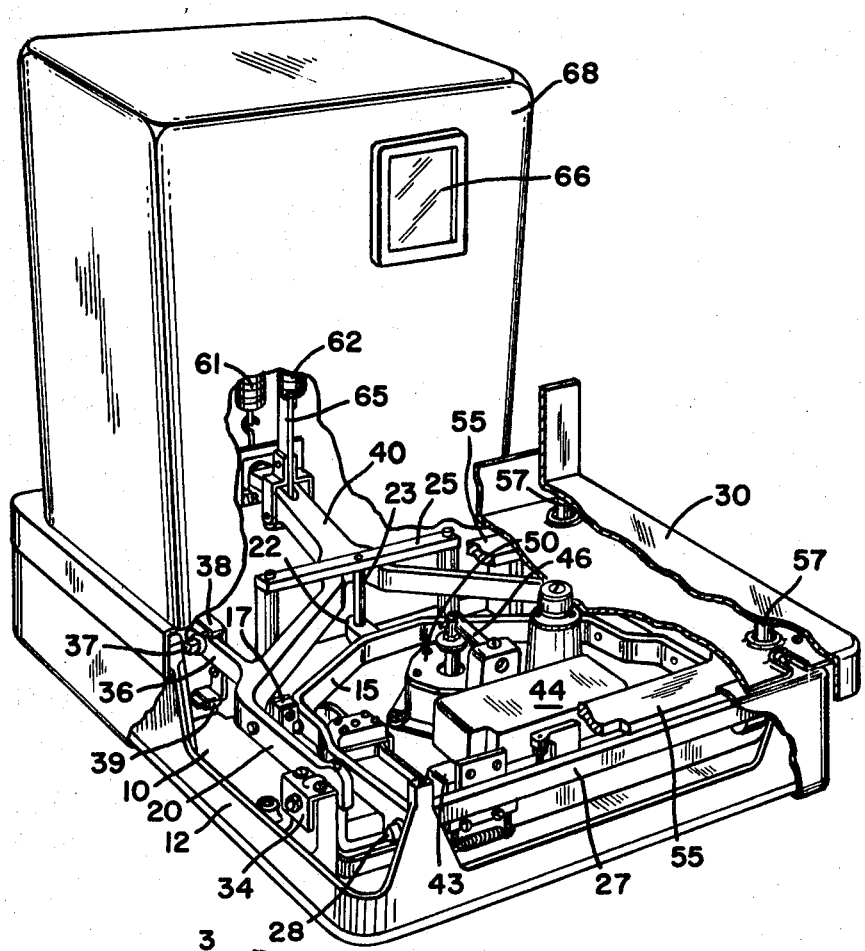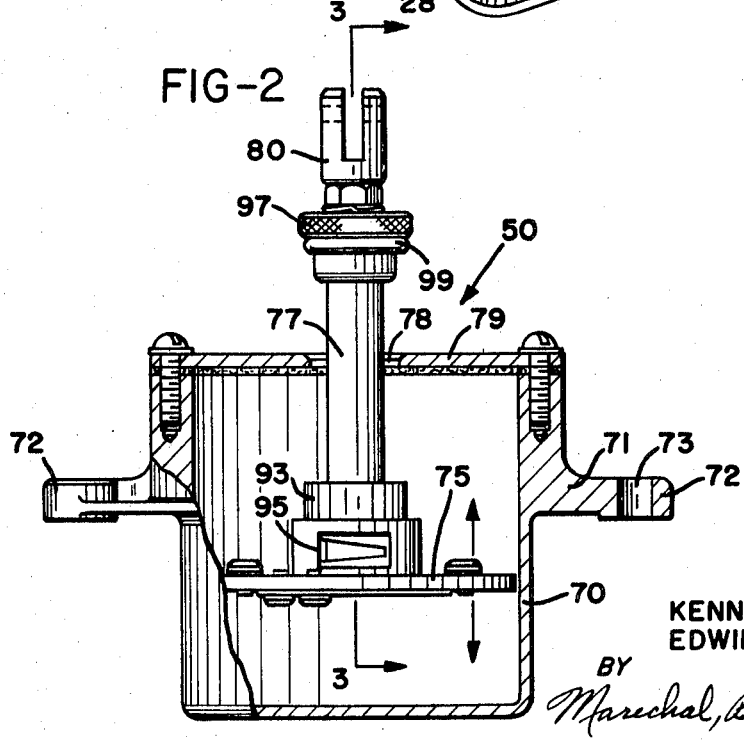

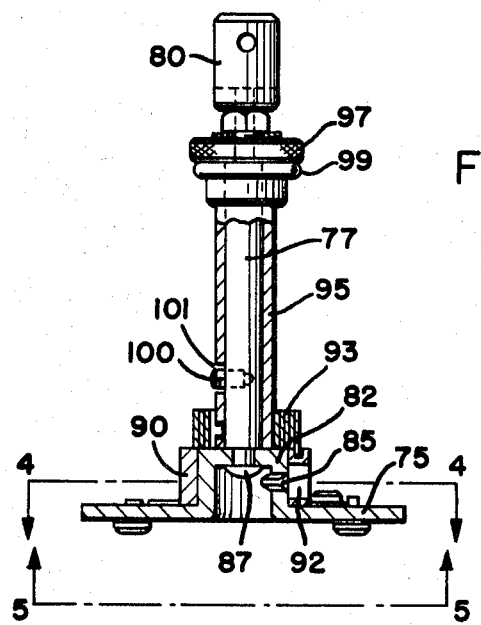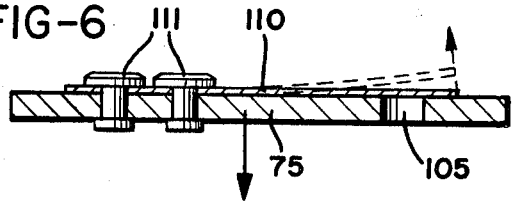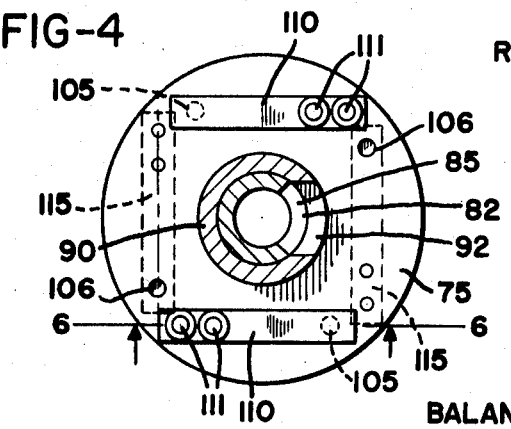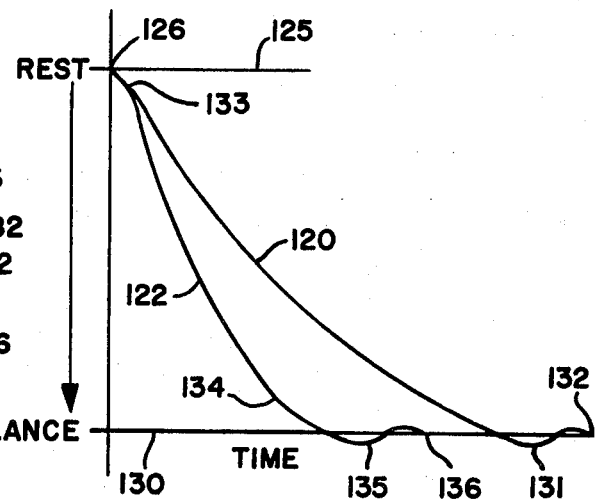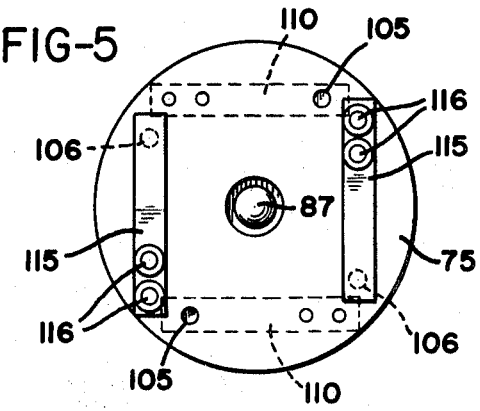

WEIGHING SCALE WITH IMPROVED DASH POT

BACKGROUND OF THE INVENTION

Weighing scales are typically provided with a dash pot mechanically coupled to a scale platter to dampen oscillations in the platter and to steady the chart displaying the weight reading. Typically, the dash pot includes a plate which moves through a fluid, usually a liquid, to dampen oscillations. The dash pot, however, slows the movement of the scale platter from one equilibrium position to another. This is an inherent result of the resistance to movement of a plate through a fluid. The resistance to movement is a function of the viscosity of the fluid, the area of the plate moving through the fluid, and the size of the opening allowing fluid transfer from one side of the plate to the other. Usually, this opening is provided between the edge of the plate and the walls of a cylinder holding the fluid.

In many weighing scale applications, it is particularly desirable that the scale platter reach a balance condition quickly after an article has been placed thereon so that the weight can be read, and in some scales the price computed. This is especially desirable in automatic weighing scales where a conveyor moves articles onto and then off of a weighing scale and wherein the scale includes a printer which applies labels to the articles. It is important that the scale platter obtain a balance condition quickly since, when weighing both heavy and light articles, the platter must move between extremes in balance positions, and therefore the speed of operation of the scale depends in part upon the speed of movement of the platter.

SUMMARY OF THE INVENTION

This invention relates to a weighing scale employing an improved dash pot which permits a scale platter to move quickly from one balance position to another while at the same time providing the scale platter with dampening to prevent unnecessary and unwanted oscillations.

The improved dash pot of this invention includes a conventional cylindrical housing, a plate which is configured to fit within said housing for free movement, and a liquid filling the housing through which the plate moves. The plate is mechanically attached to a scale platter and thereby dampens the movement of the platter by coacting with the liquid in the housing. A path is provided through which fluid may be transferred from one side of the plate to the other and at least one opening is formed in the path which is covered by one end of a leaf spring. The spring effectively prevents flow of fluid therethrough for minor movements of the plate relative to the fluid, but is forced out of the way of the opening when the pressure on the plate exceeds a predetermined value. With this arrangement, the plate is thereby allowed to move more quickly to a new balance position while providing effective dampening and resistance to small movements or oscillations of the plate.

In the preferred embodiment of the invention, a plurality of openings and leaf springs are provided on the plate so that large pressures of the plate in either direction will cause the effective area of the plate to be reduced, thus allowing the plate, and the scale platter, to obtain a balance condition quickly and at the same time provide effective dampening of platter movement.

Accordingly, it is an object of this invention to provide a motion dampening apparatus of the type described including a chamber, a plate mounted for free movement within said chamber, a fluid filling the chamber to dampen the movement of the plate, a path through which fluid may be transferred from one side of the plate to the other side, and a valve in the path which is closed during minor displacements of the plate and which opens to permit freer movement of the plate when the fluid pressure in the plate exceeds a predetermined value; to provide an improved dash pot of the type described which includes a plurality of openings in a plate, each covered by one end of a plate attached leaf spring, with the leaf springs being mounted on both sides of the plate to permit rapid displacements of the plate with either equal or unequal freedom in either direction; and to provide an improved motion dampening device for use in a weighing scale to facilitate the movement of the scale platter to a balance position while dampening the motion of the platform to minor displacements.

Other objects and advantages of the invention will be apparent from the following description, the accompanying drawings and the appended claims.

BRIEF DESCRIPTION OF THE DRAWINGS

FIG. 1 is a perspective view of a weighing scale with a portion of the housing cut away to show details of the scale mechanism;

FIG. 2 is an elevational view, partly in cross section, showing the improved motion dampening device constructed according to this invention;

FIG. 3 is a cross sectional view taken along lines 3—3 of FIG. 2;

FIG. 4 is a view taken along line 4—4 in FIG. 3 showing the plate, the openings in the plate, and the leaf spring valves covering the openings;

FIG. 5 is a view taken along lines 5—5 in FIG. 3 showing the other side of the plate along with the openings and the leaf spring valves;

FIG. 6 is a true section of the plate taken along line 6—6 of FIG. 4 showing particularly one opening in the plate and the leaf spring valve covering that opening; and FIG. 7 is a graph showing the time-displacement relationship of the scale platter.

DESCRIPTION OF THE PREFERRED EMBODIMENT

Referring to the drawings which disclose a preferred embodiment of the invention, a weighing scale is shown in FIG. 1 having a base 10 including an integral upwardly turned flange 12 which extends substantially around the entire periphery of the base. This scale includes a weighing mechanism which is preferably of the double lever type with the two levers being of hollow, generally rectangular shape with one interfitting within the other. The inner lever 15 is pivoted on floating links 17 which are carried at intermediate points on outer lever 20. THe rearward end 22 of the inner lever 15 is fulcrumed by engagement with a projection having an upstanding conical end with a recess in the lower end of pin 23. The upper end of this pin has a similar recess which engages a conical projection fixed to the cross bar 25 suitably supported from opposite ends upon portions of the base 10. This provides a fixed point for preventing vertical travel of the rearward end of the lever 15 but allows for freedom of movement of the lever in a horizontal plane. The forward end 27 of the lever 15 is provided with pivots 28 forming supports for the forward end of a platter 30.

The outer lever 20 is pivoted on fulcrum bearings 34 which are fixed to the base 10. The outer lever is provided with arms 36 extending rearwardly on which are secured pivots 37 forming supports for the rearward end of the platter. Fixed upper and lower resilient stop members 38 and 39 are supported from the base 10 and engage the arms 36 to limit the travel of the outer lever 20. Outer lever 20 has a rearwardly extending portion 40 which extends around the rearward end of the inner lever 15 and around pin 23. The outer lever 20 also incorporates a transverse extending arm 43 which is offset from the pivot and on which there is mounted a zero adjustment weight 44. The arm 43 carries another arm 46 which is connected to a dash pot 50.

A platter receiving member 55 is received on the respective pair of pivots 28 at the forward part of the scale and pivots 37 at the rearward part of the scale. Extending upwardly from the platter receiving member 55 are four posts 57, two of which are shown in FIG. 1, which receive the platter 30.

When a weight is placed on the platter 30, both the inner and outer levers 15 and 20 will be moved downwardly thus moving the rearwardly extending arm 40 downwardly. This arm has connected thereto a pair of counter-balancing springs 61 and 62 and a position indicating arm 65. Although not shown, the arm 65 moves a chart which has placed thereon weight indications which then may be viewed through a window 66 in an upwardly extending housing 68. In some embodiments of the invention, the chart may also be electrically or optically read to produce a weight indication which may be used to compute the price of the article placed on the platter 30. A more complete description of one type of weighing scale mechanism with which the improved dash pot of this invention may be used may be found in U.S. Pat. No. 2,649,293. Also, when the platter receives a weight, the arm 46 moves downwardly against the resistance supplied by dash pot 50.

The dash pot 50 in the preferred embodiment of the invention, shown in FIG. 2, includes a cylindrical housing 70 having a flange 71 formed thereon, provided with extensions 72 through which openings 73 extend for securing the dash pot to the base plate 10. A circular plate 75 is contained within the housing 70 with the diameter of the plate being such that a small gap exists between the plate and the housing around the circumference of the plate. This gap allows the plate to move freely without binding against the housing 70. This gap also allows some fluid within the housing to move around the plate from one side to the other as the plate is moved by the platform.

The plate is attached to shaft 77 which extends upwardly through an opening 78 and a cover plate 79 mounted at the upper end of the housing 70. The upper end of the shaft is provided with a fitting 80 which attaches to the arm 46 and thus moves with the platter 30. As shown in FIG. 3, the plate 75 includes an upstanding member 82 which has formed therein a triangular slot 85. The shaft 77 is secured to the member 82 by means of a rivet 87.

A temperature compensating ring 90 surrounds the member 82 and has formed therein a rectangular opening 92 which cooperates with the slot 85 to define a variable area opening through which fluid may flow, depending upon the position of the opening 92 relative to the slot 85. The position of the temperature compensating ring 90 is determined in part by a bimetallic spring 93, one end of which is secured to the ring 90 and the other end of which is attached to a hollow tube 95. The upper end of the tube 95 is attached to a knurled knob 97 which is accessible from the exterior of the dash pot. By rotating the knob 97 relative to the shaft 77, the area of the opening through which fluid may pass can also be controlled thus to control the degree of damping of the dash pot. An O-ring 99 cooperates with the opening 78 to seal the assembly when the plate 75 is in its downwardmost position which occurs when the scale is prepared for shipment. A set screw 100 cooperates with a slot 101 formed in the hollow tube 95 to limit its angle of rotation.

The bimetallic member 93 will move the temperature compensating ring 90 to open the aperture beyond that set by the knob 97 when the liquid which fills the dash pot cools and has a higher index of viscosity. This allows more uniform damping action under varying temperature conditions.

As shown in FIGS. 4 through 6, a plurality of openings 105 and 106 may be formed in the plate 75 for the purpose of increasing the effective area of the openings in the plate under those conditions where the fluid pressure on the plate increases above a predetermined value. Openings 105 are covered by leaf springs 110, one end of which covers the opening and the other end of which is secured to the plate 75 by means of rivets 111. In like manner, leaf springs 115 have one end covering openings 106 and the other ends thereof are secured by rivets 116 or other suitable fastening means to the plate 75. While the openings 105 and 106 are shown in the drawings as circular, they may be of any appropriate configuration and area.

FIG. 6 shows a detailed cross sectional view of the leaf spring 110 which controls flow of the fluid through the opening 105. When an object is placed on the platter 30, for example, the plate 75 will move downwardly and the force of the fluid within the housing 70 will be exerted upon the spring 110. When this force exceeds the bias of the spring, the spring will begin deflection toward the position shown by the dashed lines, thus opening the valve and allowing the fluid to flow through the opening 105. This decreases the effective area of the plate and allows the plate to move more rapidly to a new position. Upon reaching a balance position, the spring 110 will again close the opening 105 and thereafter the plate 75 will act as a conventional dash pot for minor plate displacement. Springs 115 covering openings 106 act in a similar manner when the plate is moved in the other direction.

In FIG. 7, the displacement of the plate 75 with respect to time after the placing of a weight on the platter 30 is shown by curves 120 and 122. Curve 120 represents the displacement of the platter with respect to time using a conventional dash pot. Curve 122 is a curve showing the displacement of the platter with respect to time utilizing the improved dash pot of this invention.

The rest position of the platter is shown at 125, and when a weight is placed on the platter, as indicated at 126, the platter begins its downward movement. Without the improved dash pot of this invention, this movement with respect to time is illustrated by curve 120. The platter will usually overshoot the balance position 130 slightly at 131 and then come at rest at 132. With the improved dash pot of this invention, however, almost immediately after the weight is placed on the platter, the fluid pressure exerted on the plate will exceed the tension on the spring 110 which will move clear of the opening to allow passage of fluid through the opening 105, and this occurs at the time indicated at 133 in FIG. 7. Opening 105 will remain open until the platter approaches its balance position, as indicated at 134, at which time the pressure on the spring will decrease and the opening 105 will again be closed. Thereafter, the curve will approximate the slope of curve 120 and the platform will typically overshoot the balance position 130 and 135 and finally approach the balance position as indicated at 136. The time between 132 and 136 represents the time saved in the platter reaching its balance position due to this invention.

The slope of the curve 122 will be determined in part by the areas of the openings 105 and the tension on the spring 110 will determine the time when fluid can pass through the opening, thus determining the location of points 133 and 134 in FIG. 7.

The openings 105 may be of larger diameter than openings 106, or the relative number of openings may be greater, in order to permit the platter to reach a balance position more quickly in its downward movement than in the upward movement, if such an operating condition is desired. This invention therefore permits the more rapid movement of a scale platter to its balance position, as compared to a conventional dash pot, while at the same time allowing continuous damping of the platter at the balance position.

Thus, the invention includes the use of openings or orifices in the plate of the dash pot which are covered by a leaf spring and which open to permit rapid movement of the plate when the force on the plate exceeds a predetermined amount, the openings thereafter being closed to increase the motion dampening efficiency of the plate.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a weighing scale including a platter adapted to receive articles to be weighed, means for displaying the weight of the articles placed on said platter, and means to dampen minor motion of said platter to facilitate the reading of said weight, the improvement comprising a dash pot connected to said platter, said dash pot including a container filled with a fluid and a plate mounted to move within said container in response to the movement of said platter;

means forming openings in said plate having a size to facilitate the movement of said platter toward a balance position; and valve means closing said openings, said valve means being biased to open when the fluid pressure on said valve means exceeds a predetermined amount;

said valve means opening to facilitate said platter reaching its balance position quickly and thereafter closing to dampen minor movement of said platter.

2. The weighing scale of claim 1 wherein said valve means includes a leaf spring having one end thereof secured to said plate the other end thereof covering said opening, said spring being biased to close said opening until the fluid pressure on said spring exceeds a predetermined amount.

3. The weighing scale of claim 1 wherein said plate includes a plurality of openings formed therein having at least two different areas and wherein leaf springs are mounted on one side of said plate to cover the openings of one area and wherein leaf springs are mounted on the other side of said plate which covers openings of the other area thereby facilitating movement of said plate in opposite directions when fluid pressure on said respective springs exceeds different predetermined amounts.

* * * * *